(12) United States Patent
Enns

(10) Patent No.: US 6,586,697 B1
(45) Date of Patent: Jul. 1, 2003

(54) TRANSPORTABLE ELECTRICAL SWITCHING ASSEMBLY WITH HIGH VOLTAGE CIRCUIT INTERRUPTER

(75) Inventor: Jonathan Herman Enns, Winnipeg (CA)

(73) Assignee: Pauwels Contracting Inc., Winnipeg (CA)

( * ) Notice: Subject to any disclaimer, the term of this patent is extended or adjusted under 35 U.S.C. 154(b) by 0 days.

(21) Appl. No.: 10/205,488

(22) Filed: Jul. 26, 2002

(51) Int. Cl.[7] .............................................. H01H 33/14
(52) U.S. Cl. .......................... 218/7; 218/154; 361/333; 361/334
(58) Field of Search .................. 218/7, 154; 200/50.21, 200/50.23, 17 R; 361/606, 610

(56) References Cited

U.S. PATENT DOCUMENTS

| | | | | |
|---|---|---|---|---|
| 4,367,512 A | * | 1/1983 | Fujita .......................... | 361/625 |
| 4,562,360 A | * | 12/1985 | Fujimoto .................... | 361/603 |
| 6,072,142 A | * | 6/2000 | Linder et al. ............... | 218/154 |
| 6,388,869 B1 | * | 5/2002 | Fauteux et al. ............. | 361/625 |
| 6,430,035 B2 | * | 8/2002 | Skold et al. ................. | 361/605 |
| 6,469,270 B1 | * | 10/2002 | Omori et al. ................. | 218/7 |

* cited by examiner

Primary Examiner—Elvin Enad
Assistant Examiner—Marina Fishman
(74) Attorney, Agent, or Firm—Adrian D. Battison; Michael R. Williams; Ryan W. Dupuis

(57) ABSTRACT

A mobile electrical transformer assembly is mounted on a trailer and includes a three phase transformer. The electrical switching for the transformer includes a circuit interrupter having three vertical towers at transversely spaced positions. Each tower and its associated lightning arrester is mounted on two arms of one of three vertical posts in a row. In respect of the outer posts, both of the arms are pivotal about the vertical axis of the post to move the tower and the arrester outwardly to increase the spacing. The arm of each tower includes a bracket at the bottom mounted for pivotal movement about a horizontal axis for movement of the tower from a vertical operating position to an inclined transport position. The arm of each arrester is movable so that the arresters are moved in the transport position to a location out of alignment with the respective tower.

17 Claims, 4 Drawing Sheets

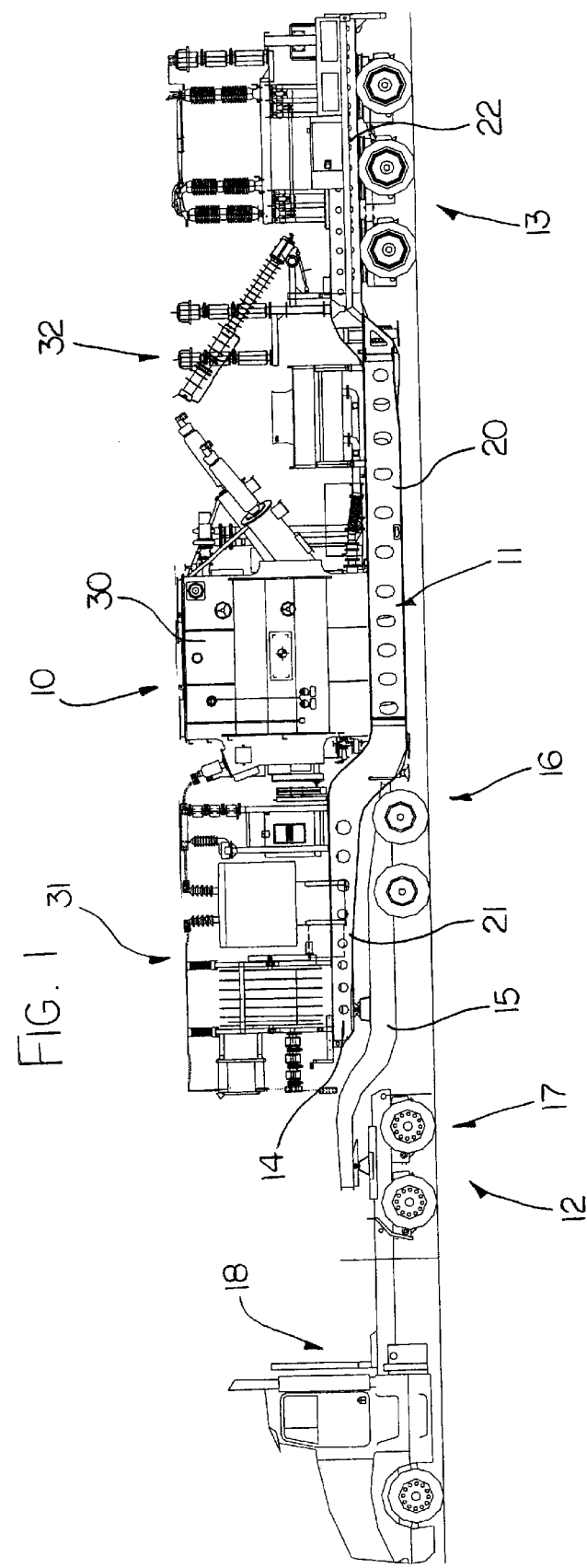

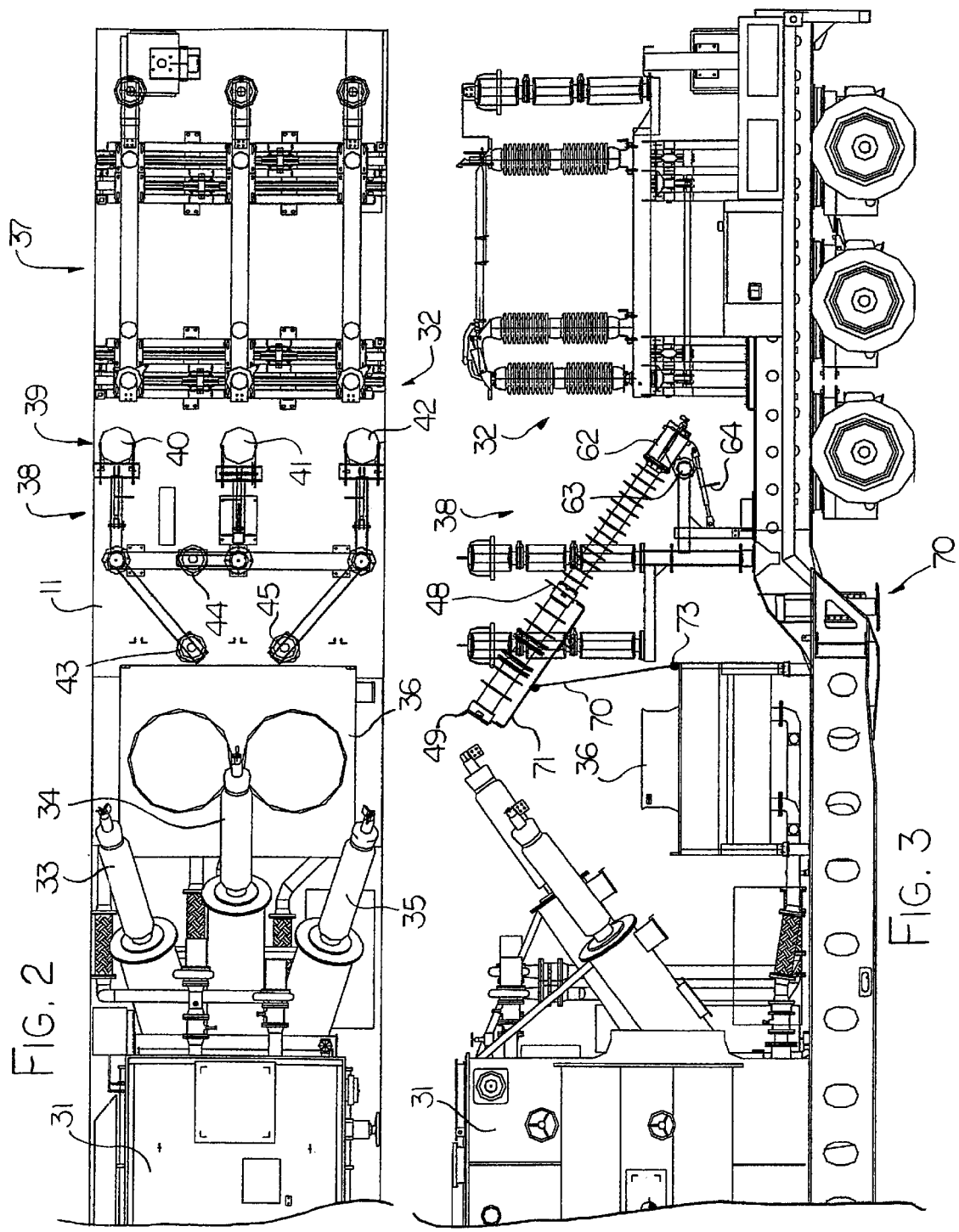

TRANSPORTABLE ELECTRICAL SWITCHING ASSEMBLY WITH HIGH VOLTAGE CIRCUIT INTERRUPTER

This invention relates to a transportable electrical switching assembly of the type which includes various electrical switching components mounted on a trailer so as to be transportable on highways within acceptable highway dimensions to a temporary use location.

BACKGROUND OF THE INVENTION

Various types of switching and transformer assemblies have typically been provided on highway trailers for transportation to a required use location and examples are manufactured by Pauwels Contracting Inc. of Winnipeg, Manitoba, Canada for this purpose. These units are referred to as 'mobiles' within the electrical utility industry. Typically such devices include a transformer mounted on a lower section of the trailer, a low voltage section with switches and circuit interrupters at one end and a high voltage section with switches and circuit interrupters at the opposed end. However other configurations and other combinations of components are often mounted for transportation in this manner.

One component which has recently become available is a switching unit known under the trademark of "transrupter" which is a tower manufactured by the S & C Electric Company. This has a height of the order of 10 (ten) feet and must be located in vertical orientation so that, while it is eminently suitable from an operational and total weight point of view for a mobile unit of the above type, it has not been possible to be used in view of its height on the trailer being well above the legal transportation height. Overall compactness of mobiles is also a major or even critical factor.

SUMMARY OF THE INVENTION

It is one object of the present invention to provide an improved mobile electrical switching assembly.

According to the invention therefore there is provided a mobile electrical switching assembly comprising:

a trailer having a trailer bed, ground wheels for supporting the trailer bed and a hitch connection for towing of the trailer along highways by a tractor vehicle;

three phase electrical switching components mounted on the trailer bed for transportation thereby to a required location for temporary connection to a high voltage electrical supply;

the electrical switching components including a circuit interrupter coordinated for three phase electrical supply including three individual towers arranged to operate on a respective phase and arranged in use to be mounted vertically at transversely spaced positions on the trailer;

each tower being mounted on a respective support carried on the trailer so as to support the tower in operation and in transportation;

each support including a bracket attached to a bottom of the tower with the bracket mounted for pivotal movement about a horizontal axis for movement of the tower about the axis from a vertical operating position to an inclined transport position.

Preferably each support is arranged such that in the transport position the tower is inclined so that it extends from the bracket upwardly and along the trailer.

Preferably each support is arranged such that the tower is inclined at an angle of the order of 45 degrees such that its upper end in the transport position is at a height less than 13.5 feet from the ground. The circuit interrupter is typically mounted over the rear axles of the trailer so that the bottom of the circuit interrupter is at 5–6 feet above ground level.

Preferably there is provided a brace member arranged to extend from the trailer to a position on the tower spaced from the bracket for bracing the tower in the inclined transport position.

Preferably the upper end of the brace connects to a bracket extending along the tower and connected thereto at two spaced collars thereon, where the bracket is removed during operation.

Preferably the trailer includes a lower bed section and a raised section and wherein the towers are mounted on the raised section. Although many configurations are possible.

Preferably the brackets are rotated about the horizontal axis by a manually operable turn-buckle which provides a simple inexpensive operation for the infrequent use necessary for movement between transport and operating positions. However suitable powered components can also be provided.

In most cases, the electrical switching components include a transformer but other mobile switching assemblies of various different operations may use the same tower type circuit interrupters and the mounting described above.

Preferably the towers are arranged in a row across the trailer and the bracket of each is arranged for pivotal movement about a common transverse axis so that, when inclined in the transport position, the towers lie in a common plane inclined to the trailer.

Preferably the two outer towers are mounted such that, when in the vertical operating position, their position on the trailer can be moved outwardly of the trailer so as to increase the spacing of each of the outer towers from the center tower in the operating position. Typical phase spacing for these components can range from 7–9 feet. Typical trailer width is 8.5 feet.

Preferably the bracket of each of the two outer towers is mounted on a respective tower arm mounted for rotation about a vertical axis on a respective support or post such that rotation of the tower arm about the vertical axis moves the bracket of the respective circuit interrupter outwardly relative to the trailer.

Preferably each tower is associated with a respective one of three further components, such as lightning arresters, to which it is electrically connected and which is mounted in vertical orientation parallel to the respective tower on a bracket carried on the respective post.

Preferably each further component is mounted on a component arm separate from the tower arm of the respective tower and carried on the respective post. The preferred mounting for the elements is defined by the post and two collars since this is simple and mechanically effective, but other mounting arrangements can be employed within the knowledge of one skilled in this art.

Preferably at least the two outer component arms are pivotal on a collar about the respective vertical axis on the respective post for increasing the spacing therebetween in the operating position thereof.

Preferably each of the component arms is pivotal about the respective vertical axis on the respective support for moving the further component out of alignment with the respective tower when the tower is moved to the inclined transport position. This allows the tower to be located at a minimum spacing from the further component which would otherwise cause the tower to interfere with the further component when inclined to the transport position, by moving the, further component to one side on its arm. The center component is also moved to one side and thus is also mounted on an arm, although the arm may be of reduced length relative to the arms of the outer components.

In one example each of the further components comprises a lightning arrester, although other components may be used in a similar configuration with the towers.

BRIEF DESCRIPTION OF THE DRAWINGS

One embodiment of a transportable switching assembly according to the present invention is described in conjunction with the accompanying drawings in which:

FIG. 1 is a side elevational view of a mobile electrical switching assembly according to the present invention and including a tractor for towing the trailer, with the assembly shown in the transport position.

FIG. 2 is a top plan view of the mobile electrical switching assembly of FIG. 1, with the assembly shown in the transport position.

FIG. 3 is a side elevational view of the mobile electrical switching assembly of FIG. 1, with the assembly shown in the transport position.

DETAILED DESCRIPTION OF THE PREFERRED EMBODIMENT

Figure 4:
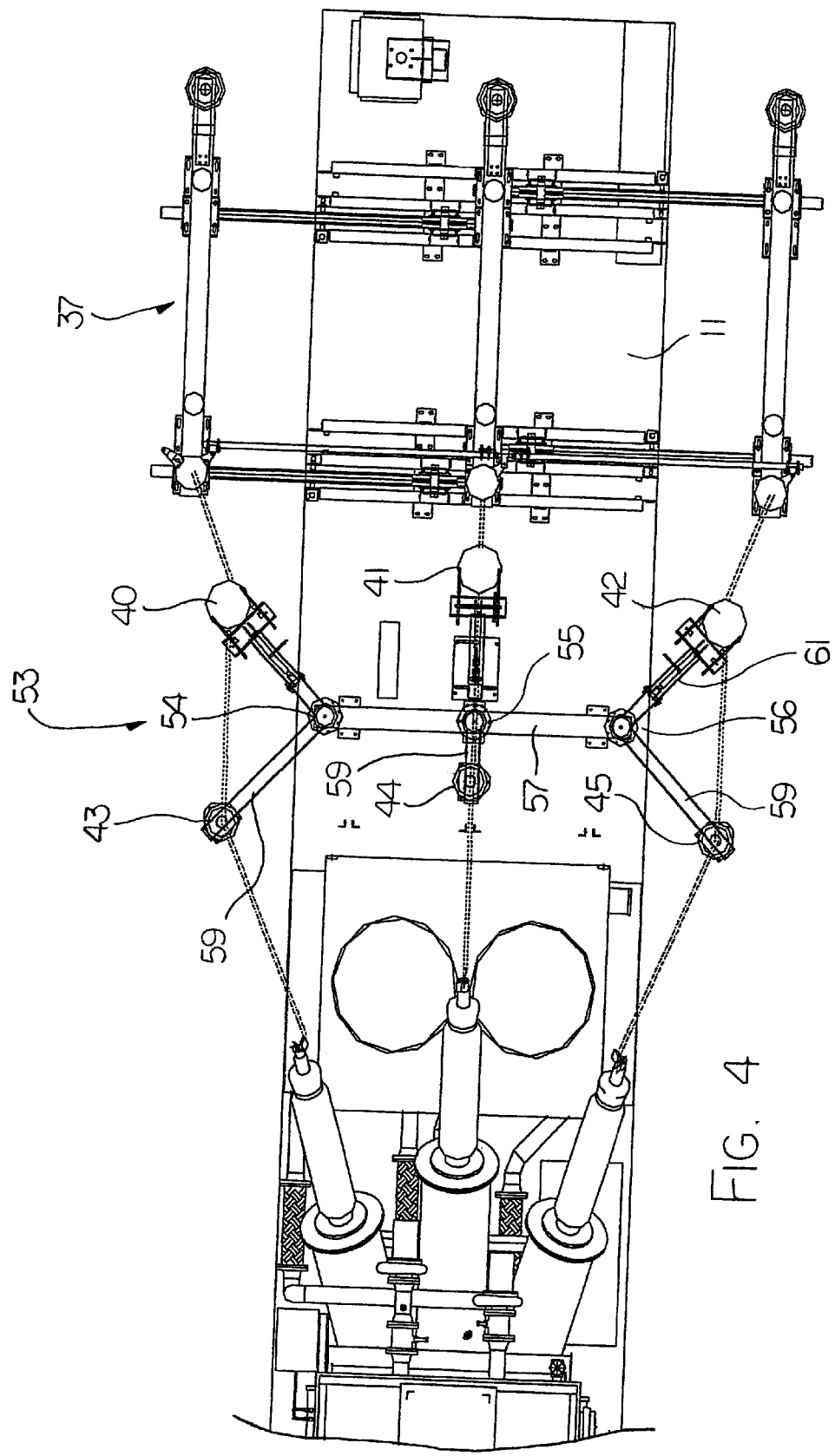
FIG. 4 is a top plan view of the mobile electrical switching assembly of FIG. 1, with the assembly shown in the operating position.

A mobile or transportable electrical switching assembly is generally indicated at 10 and comprises a low bed trailer 11 towed by a suitable highway tractor 12. In the embodiment shown, the loading is such that the trailer has three rear axles 13 and the hitch 14 of the trailer is carried on a dolly 15 which spreads the load between axles 16 of the dolly and axles 17 of the tractor 18.

The trailer 11 comprises a low bed trailer with a center section 20 to go with the front raised section 21 over the kingpin hitch 14 and a raised rear section 22 over the rear axles 13. The center section is dropped between the axle so as to maintain the height of the trailer bed at a minimum so as to maximize the area above the trailer which is available for the electrical components of the switching assembly within the maximum acceptable highway height which is typically 13.5 feet although some areas will allow up to 14 feet depending on local underpasses. It is highly desirable that the trailer has all of its elements located within the acceptable highway dimensions so that the vehicle can be transported over conventional highways without clearance difficulties or the necessity for additional permits.

Various configurations and arrangements of the components of the switching assembly can be used and the arrangement shown in the figures is only one example. In this example there is provided a conventional transformer 30 which is located on the trailer at the forward end of the center section 20. In advance of the transformer 30 is located a low voltage section 31 including conventional switching and interrupter circuits for connection to the three phase low voltage load in a conventional manner.

Rearwardly of the transformer 30 is located the high voltage section 32 which is arranged to receive current from a high voltage three phase supply again in a conventional manner. Thus in practice the switching assembly is moved temporarily to a required location for example for replacement of an existing transformer during repair and is temporarily attached to the supply in replacement for the existing transformer so that it can supply the required electricity to the load temporarily until the requirement for the mobile switching assembly is removed. The trailer thus can be parked at the required location temporarily and can be collected again by the tractor 18 for transportation to another site where temporary action is required.

Turning now to FIGS. 2 through 5 there is shown the high voltage section 32 and on the trailer 11 at the rear of the transformer 31. Thus the transformer includes three connectors 33, 34 and 35 at the rear end for connection to the respective phases of the electrical supply. A cooling system 36 for the transformer is mounted on the trailer at the rear of the transformer.

The high voltage section includes a switching section generally indicated at 37 which is of a conventional nature. Between the transformer and the switching section is provided a circuit protection section 38. The section 38 includes a circuit interrupter 39 in the form of three circuit interrupter towers 40, 41 and 42. The section 38 further includes three lightning arresters 43, 44 and 45.

The transrupter towers are commercially available from S & C Electric Company of Chicago. The lightning arresters are also commercially available from a number of suppliers for example Hubbell or ABB.

Figure 5:
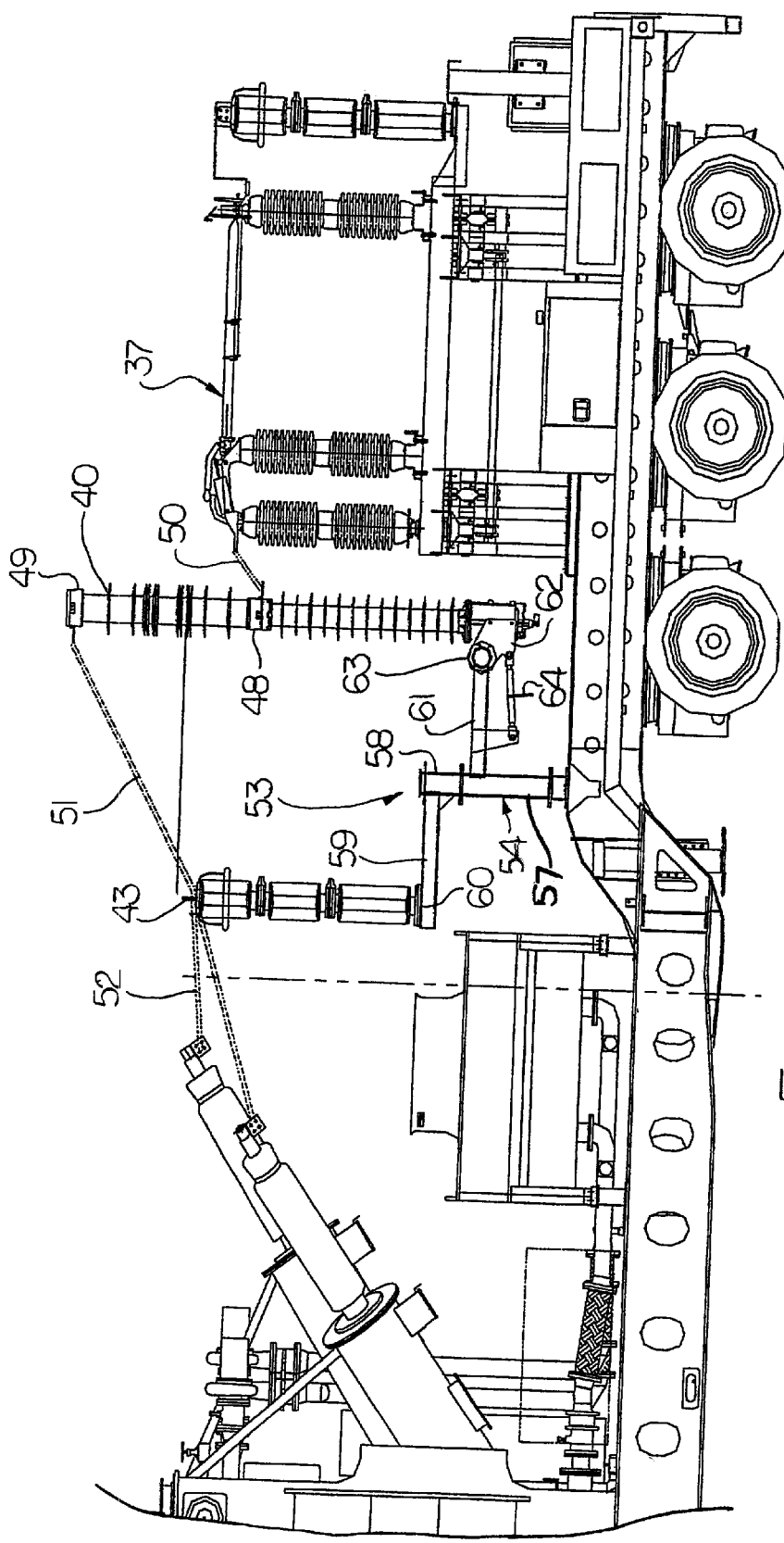
FIG. 5 is a side elevational view of the mobile electrical switching assembly of FIG. 1, with the assembly shown in the operating position.

In operation as shown in FIGS. 4 and 5, the electrical supply from the switching assembly 37 is connected in each separate phase through the respective tower to the respective lightning arrester and to the respective input connector of the transformer. Thus there is an electrical connection from the switching assembly 37 to a first collar 48 on the tower and from a second cellar 49 at the top of the tower to the top of the lightning arrester. An electrical connection is then provided from the lightning arrester to the respective input terminal of the transformer. Electrical connections are shown respectively at 50, 51 and 52.

As best shown in FIGS. 4 and 5, the lightning arrester 43 is associated with the tower 40 and both are mounted on a common mounting assembly 53. Similarly the center lightning arrester 44 is associated with the center tower 41 and is mounted on a support 55. Finally the lightning arrester 45 is associated with the tower 42 and mounted on a support 56.

Each of the supports 54, 55 and 56 is in the form of a vertical post carried on a transverse beam 57 with the beam fastened to the bed of the trailer 11. Thus each of the posts stands upwardly from the beam 57 with the posts standing vertical and arranged in a row across the width of the trailer. Each post carries a lower swivel collar 57 and an upper swivel collar 58 mounted for swivelling rotation around the vertical axis of the post. The upper swivel collar 58 carries an arm 59 projecting horizontally away from the post with the outer end of the arm carrying a bracket 60 supporting the respective lightning arrester. Similarly the collar 57 carries an arm 61 which extends away from the post horizontally to a bracket 62 which supports the lower end of the respective tower. The bracket 62 on the arm 61 includes a horizontal pivot 63 extending transversely to the arm 61 that is in a horizontal direction allowing the bracket 62 to swivel about the horizontal axis to tilt the tower about that axis. The position of the bracket 62 around the pivot 63 is controlled by a turn buckle 64.

In the operating position shown in FIGS. 4 and 5, the arms 59 of the outer arresters 43 and 45 are turned about the vertical axis defined by the respective post so that the arm is no longer longitudinal to the trailer but is instead inclined outwardly from the side of the trailer at an angle of the order of 30 degrees so as to move the arrester 45 outwardly of the trailer and thus increase its distance from the arrester 44 which remains on the center line of the trailer.

Similarly the arms 61 of the outer towers 40 and 42 are also inclined at an angle to the longitudinal direction of the trailer so as to space the outer towers 40 and 42 away from the center tower 41 which remains on the center line of the trailer. This movement provides the necessary operational spacing between the towers 40, 41 and 42 and also the necessary operation spacing between the arresters 43, 44 and 45.

In will be noted that the arms 59 of the arresters 43 and 45 are longer than the arm 59 of the arrester 44 so that the spacing between the respective arrester and the respective tower is substantially equal for each of the three phases.

In movement to the transport position for transportation of the assembly when the electrical current is removed, the arms 59 and 61 of the outer phases are moved back to the position within the bounds of the trailer as best shown in FIG. 4. Thus the arms 59 are pivoted inwardly to a position inward of the line longitudinal of the trailer so that the arms are inclined inwardly of the trailer as shown in FIG. 2. Also the arm 59 of the center arrester 44 is rotated around its respective post so that it is also moved off the line longitudinal of the trailer contained in the respective post. Thus the arresters are moved to a stored position within the area of the supports 54 but each is moved off a longitudinal line containing the respective post.

The arm 61 of the outer towers 40 and 42 are then pivoted to a position lying directing along the longitudinal line of the trailer. In this position, the turn buckle 64 is actuated so as to pivot the bracket 62 around the axis of the transverse pivot 63 thus tilting the respective tower forwardly along the length of the trailer to an inclined position at an angle of the order of 45 degrees. Since the respective arrester is moved off the respective longitudinal line, the inclined tower does not interfere with or contact the respective arrester and passes by that arrester in the inclined position as best shown in FIG. 3. Thus the upper end of each of the towers is moved to a height approximately equal to or within the total height of the arresters and within the total height of the respective connector of the transformer. As these elements are arranged at generally the maximum transportation height, the towers are also moved to within this maximum height.

In order to support the inclined towers during transportation a brace is connected between each tower and a suitable location on the trailer to provide support for the upper end of the tower thus reducing the counter lever effect on the bracket 62. Thus in the example shown, the brace 70 extends from a bracket 71 of the tower to a mounting frame portion 73 on the trailer. The bracket 71 is provide as an additional mounting element together with the brace 70 but the bracket 71 extending along the tower connected between the collars 48 and 49 of the tower. The rest of the bracket 71 is readily attached to the tower using the electrical connections which have been disconnected for the transportation position. The bracket 71 thus can be attached to the tower without mechanical difficulty an includes a link extending between the collars to provide mechanical support for the weight of the tower and to transfer that weight through the collars and through the brace to the trailer.

Suitable locking screws are provided for locking the collars 57 and 58 at the required angular positions around the respective post.

While the above description describes one example of a particular unit, minor variations can of course occur including minor variations in angles and the location of the arrester. In one example, not shown, the arrester may mounted separately from the tower on its own pivot.

While one embodiment of the present invention has been described in the foregoing, it is to be understood that other embodiments are possible within the scope of the invention. The invention is to be considered limited solely by the scope of the appended claims.

What is claimed is:

1. A mobile electrical switching assembly comprising:
 a trailer having a trailer bed, ground wheels for supporting the trailer bed and a hitch connection for towing of the trailer along highways by a tractor vehicle;
 three phase electrical switching components mounted on the trailer bed for transportation thereof to a required location for temporary connection to a high voltage electrical supply;
 the electrical switching components including a circuit interrupter coordinated for three phase electrical supply including three individual towers arranged to operate on a respective phase and arranged in use to be mounted vertically at transversely spaced positions on the trailer;
 each tower being mounted on a respective support carried on the trailer so as to support the tower in operation and in transportation;
 each support including a bracket attached to a bottom of the tower with the bracket mounted for pivotal movement about a horizontal axis for movement of the tower about the axis from a vertical operating position to an inclined transport position.

2. The assembly according to claim 1 wherein each support is arranged such that in the transport position the tower is inclined so that it extends from the bracket upwardly and along the trailer.

3. The assembly according to claim 1 wherein each support is arranged such that the tower is inclined at an angle of the order of 45 degrees such that its upper end in the transport position is at a height less than 13.5 feet from the ground.

4. The assembly according to claim 1 wherein there is provided a brace member arranged to extend to a position on the tower spaced from the bracket for bracing the tower in the inclined transport position.

5. The assembly according to claim 4 wherein the brace extends to the trailer.

6. The assembly according to claim 4 wherein the upper end of the brace connects to a bracket connected along the tower and connected thereto at two spaced collars thereon.

7. The assembly according to claim 1 wherein the trailer includes a lower bed section and a raised section and wherein the towers are mounted on the raised section.

8. The assembly according to claim 1 wherein the brackets are rotated about the horizontal axis by a manually operable turn-buckle.

9. The assembly according to claim 1 wherein the electrical switching components include a transformer.

10. The assembly according to claim 1 wherein the towers are arranged in a row across the trailer and the bracket of each is arranged for pivotal movement about a common transverse axis so that when inclined to the transport position, the towers lie in a common plane inclined to the trailer.

11. The assembly according to claim 10 wherein the two outer towers are mounted such that their position on the trailer can be moved outwardly of the trailer so as to increase the spacing of each of the outer towers from the center tower in the operating position.

12. The assembly according to claim 10 wherein the bracket of each of the two outer towers is mounted on a respective tower arm mounted for rotation about a vertical axis on a respective support such that rotation of the tower arm about the vertical axis moves the bracket of the respective circuit interrupter outwardly relative to the trailer.

13. The assembly according to claim 1 wherein each tower is associated with a respective one of three further components to which it is electrically connected and which is mounted in vertical orientation parallel to the respective tower on a bracket carried on the respective support.

14. The assembly according to claim 13 wherein each further component is mounted on a component arm separate from the tower arm of the respective tower and carried on the respective support.

15. The assembly according to claim 14 wherein at least the two outer component arms are pivotal about the respective vertical axis on the respective support for increasing the spacing therebetween in the operating position thereof.

16. The assembly according to claim 15 wherein each of the component arms is pivotal about the respective vertical axis on the respective support for moving the further component out of alignment with the respective tower when the tower is moved to the inclined transport position.

17. The assembly according to claim 13 wherein each of the further components comprises a lightning arrester.

* * * * *